3,532,766
ABHESIVE COATING FOR PAPER PRODUCTS
Keith Leyshon, Roath, Cardiff, and Herbert T. Cooper, Whitchurch, Cardiff, Wales, assignors to Midland Silicones Limited, Reading, Berkshire, England
No Drawing. Filed Oct. 4, 1967, Ser. No. 672,710
Claims priority, application Great Britain, Oct. 7, 1966, 44,987/66
Int. Cl. C08g 47/02; D21h 1/34
U.S. Cl. 260—825                    6 Claims

ABSTRACT OF THE DISCLOSURE

An improved abhesive coating for paper exhibiting excellent abrasion resistance is prepared by mixing alkylhydrogen siloxane polymer, diorganosiloxane polymer, siloxane curing catalyst, an organic amino compound and an organic solvent with an alkoxy silane being optional.

---

This invention relates to a process for producing improved siloxane-coated paper and paper products, to a composition for use therein and to coated paper and paper products produced by the process.

It is now well known that siloxane polymers can be applied to cellulosic and other materials to proudce a coating on the materials which is both water repellent and abhesive, i.e. non-adherent to sticky substances. This particular property of abhesion or non-adherence has rendered the treated paper suitable for a wide variety of applications including use as interleaving for adhesive tapes and in the packaging of sticky materials such as bitumen and confectionery.

Among the siloxane polymers which have found wide application in the treatment of paper are the methylhydrogenpolysiloxanes. More recently the properties of the finished coatings have been improved by the use of methylhydrogenpolysiloxanes in combination with other organopolysiloxanes, particularly the dimethylpolysiloxanes, the compositions being applied either from an organic solvent solution or an aqueous emulsion. These improved compositions have proved largely successful and good release properties are imparted to the treated surface using either the solvent or the emulsion technique. However, it has been found that when the siloxane compositions are applied from an organic solvent solution the siloxane coating suffers from relatively poor abrasion resistance, that is it can easily be removed from the paper surface by rubbing with the finger or with a damp cloth. This lack of abrasion resistance represents a significant commercial disadvantage because removal of the siloxane coating may occur, for example, during operations involving processing of the paper over mechanical rollers.

It is the object of this invention to introduce a means of improving the abrasion resistance of siloxane paper coatings obtained by the application of compositions containing alkylhydrogenpolysiloxanes, particularly when the polysiloxanes are applied to the paper from an organic solvent solution.

We have now found that when compositions containing alkylhydrogenpolysiloxanes are applied to paper the abrasion resistance of the resulting cured siloxane coating can be improved if there is included in the treating composition one or more of certain organic amino compounds.

Accordingly, this invention provides a process for the treatment of paper wherein there is applied to the paper a mixture of (a) an alkylhydrogenpolysiloxane, (b) a diorganopolysiloxane wherein at least 80 percent of the total silicon-bonded organic radicals are methyl radicals, (c) a siloxane curing catalyst, (d) an organic amino compound selected from (i) ethanol isopropanolamine and (ii) aliphatic amines containing at least two groups selected from primary and secondary amino groups and consisting of carbon, hydrogen, and nitrogen or carbon, hydrogen, nitrogen and oxygen present as OH groups or ether linkages, and (e) an organic solvent, and thereafter curing the applied siloxane.

As the alkylhydrogenpolysiloxanes (a) there are employed in the process of this invention substantially linear siloxane polymers or copolymers in which some of the silicon atoms have hydrogen atoms bonded thereto, the remaining valencies of the silicon atoms being satisfied with alkyl radicals or with the oxygen atoms forming part of the siloxane chain. Preferred as the alkylhydrogenpolysiloxanes are those of the unit general formula RHSiO, wherein R is an alkyl radical or copolymers of these units with diorganosiloxane units, for example dimethylsiloxane units. If desired the alkylhydrogensiloxane polymers and copolymers can be endblocked with triorganosilyl units. Preferred as the alkylhydrogenpolysiloxanes are the methylhydrogenpolysiloxanes, in particular those having a molecular weight below about 20,000. These alkylhydrogensiloxane polymers are well known in the art and are produced by standard, commercial techniques.

The diorganopolysiloxanes (b) employed herein are linear or substantially linear organosiloxane polymeis wherein at least 80 percent of the total silicon-bonded organic radicals are methyl radicals. Any remaining radicals in the diorganopolysiloxane can be other organic radicals, for example hydrocarbon radicals such as ethyl, propyl, butyl, octadecyl and phenyl radicals. Preferred as the diorganopolysiloxanes are the dimethylpolysiloxanes.

Minor amounts, preferably less than 2 percent of chain-branching units can be present in the diorganopolysiloxane which can, if desired, be endblocked with organosilyl groups, for example the trimethylsilyl group. The preferred diorganopolysiloxanes are, however, those which contain about two terminal silicon-bonded hydroxyl and/or alkoxyl radicals per molecule, e.g. $\alpha,\omega$-dihydroxy dimethylsiloxane polymer and $\alpha,\omega$-dimethoxy dimethylsiloxane polymers.

The viscosity of the diorganopolysiloxane (b) is not critical and the polymer can vary in consistency from a viscous liquid to a substantially non-flowing, benzene-soluble gum. Generally, the viscosity of the polymer will be greater than 100 cs. at 25° C., the high viscosity liquids or gums being preferred for most applications.

The proportions of (a) and (b) present in the compositions employed in the process of this invention can be varied within wide limits. At least 0.1 percent by weight of the alkylhydrogenpolysiloxane, base on the total weight of (a) and (b) must be present. Although the upper limit of the range is not critical, the preferred compositions contain less than about 50 percent by weight of the alkylhydrogenpolysiloxane. The most preferred compositions for use according to this invention are those containing from about 0.1 to about 10 percent by weight of the alkylhydrogenpolysiloxane based on the total weight of the alkylhydrogenpolysiloxane (a) and the diorganopolysiloxane (b).

Improved abrasion resistance of the cured siloxane coating is obtained when there is incorporated in the siloxane composition prior to application to the paper substrate one or more amino compounds. The amino compounds which are suitable for use in the process of this invention are the compound ethanol isopropanolamine and the class of compounds which can be defined as aliphatic amines containing at least two groups selected from primary and secondary amino groups and consisting of carbon atoms, hydrogen atoms and optionally oxygen atoms in addition to the nitrogen atoms present. Examples of operative amino compounds consisting solely of carbon, hydrogen and nitrogen are ethylene diamine, diethylene diamine, tetramethylene diamine, diethylene triamine, piperazine, hexamethylene tetramine, cadaverine, 3-aminoethyl-1,6-diaminohexane, 2-pyrazoline and N,N'-dimethylhexamethylene diamine. If desired the amino compound can also contain oxygen in addition to the carbon, hydrogen and nitrogen, any such oxygen preferably being present in hydroxyl radicals, for example as in the amino alcohols such as N(2-aminoethyl)-butanolamine or in the form of ether linkages. The preferred amino compound is N(2-aminoethyl)-ethanolamine.

In order that it can be satisfactorily incorporated in the applied composition, the amino compound employed should be such that it is compatible with, or is capable of being rendered compatible with, the other components of the composition. Preferably, therefore, the amino compound chosen should be a solid or a liquid at the temperature at which the compositions are prepared. If desired one or more compatibilizing solvents, for example, ethanol or isopropanol, can be employed to facilitate the dispersion or solution of the amino compound in the composition.

The proportion of the amino compound employed is not narrowly critical and can vary from 0.1 percent to 15 percent or more based on the combined weight of the alkylhydrogenpolysiloxane (a) and the diorganopolysiloxane (b). However, the presence of more than about 15 percent of the amino compound may interfere with the release properties of the siloxane coating and effects no significant further improvement in the abrasion resistance of the siloxane coating. Preferably the amino compound is employed in a proportion ranging from 0.5 percent to 7.5 percent by weight based on the total weight of the polysiloxanes (a) and (b).

According to a further aspect of this invention, we have found that an additional improvement in the abrasion resistant characteristics of the applied siloxane coating can be effected if there is also incorporated in the applied composition one or more specified silanes.

The silanes which have been found operative in producing the improved abrasion resistant effect are those of the general formula $R'_nSi(OR'')_{4-n}$ wherein each $R'$ is a monovalent hydrocarbon or halohydrocarbon radical and $R''$ is an alkyl radical containing less than 5 carbon atoms or is the radical —$CH_2CH_2OQ$ wherein Q is an alkyl radical or the phenyl radical, and $n$ has a value of 0, 1, 2 or 3.

As the $R'$ radicals there can be present in the silane hydrocarbon radicals, for example, methyl, ethyl, propyl, octadecyl, vinyl, cyclohexenyl, phenyl and tolyl radicals, and halohydrocarbon radicals, for example, chloromethyl, bromoethyl, trichlorophenyl, and 3,3,3-trifluoropropyl radicals. $R''$ can be, for example, the methyl, ethyl or propyl radicals or the radical —$CH_2CH_2OQ$ where Q represents the methyl, ethyl, butyl, n-hexyl or phenyl radicals.

Examples of the silanes which can advantageously be incorporated in the compositions of this invention therefore are methyltrimethoxysilane, propyltriethoxysilane, vinyltriethoxysilane, phenyltributoxysilane, tetraethoxysilane, tributylethoxysilane, tetra(methoxyethoxy)silane, dimethyldi(methoxyethoxy)silane, trimethylmethoxysilane, and chlorophenyltriethoxysilane. The preferred silanes are those in which $R'$ is selected from methyl and ethyl radicals and $R''$ is selected from methyl radicals and methoxyethoxy radicals. Most preferred is tetra(methoxyethoxy)silane, $Si(OCH_2CH_2OCH_3)_4$.

The silane component can be employed in amounts of up to 20 percent or more based on the total weight of the siloxanes (a) and (b). Normally, however, we prefer to employ the silane in proportions of from 0.5 to 10 percent by weight based on the total weight of siloxanes (a) and (b). Incorporation of the silane with the remainder of the components of the composition does not require any special techniques. It can simply be mixed in with the other components or it can be pre-mixed with one or more of the components, for example the curing catalyst and/or the amino compound prior to combination with the remaining ingredients of the composition.

The compositions of this invention are applied to the paper in the form of a solution or dispersion in the organic solvent (e). Any organic solvent or mixture of solvents can be employed but it will be understood that the organic solvent should be sufficiently volatile to permit its removal and allow cure of the siloxane coating to take place at a temperature below that at which deterioration of the paper substrate or the siloxane coating takes place. The preferred solvents are liquid hydrocarbons such as toluene, xylene and mineral spirits although other solvents such as trichloroethylene and perchloroethylene can be used.

The proportion of organic solvent used in the applied composition will normally depend upon such factors as the desired degree of pickup of siloxane on the paper substrate and on the processing conditions and can be varied within wide limits. For most purposes, however, organic solvent will preferably comprise from 50 to 99 percent by weight of the total weight of the composition with best results obtained employing 90 to 99 percent by weight of organic solvent.

Any of the wel-known paper coating techniques such as roller coating, application by Meyer rod or knife coating can be employed to treat paper and paper products according to the process of this invention. Following the coating step the paper can then be allowed to dry by storage at room temperature and the siloxane thereafter cured. In practice, however, we prefer to hasten the drying step and the subsequent cure of the siloxane and this can be achieved by heating the coated paper, preferably to a temperature within the range from 60° to 150° C. for periods varying from two seconds to 15 minutes. The curing step is further expedited by including in the compositions a curing catalyst for the siloxane. Suitable catalysts and the quantities in which they are employed are well known in the art the normally preferred catalysts being the metal salts of carboxylic acids, such as stannous octoate, stannous oleate, stannous aceate and zinc octoate and organic metal compounds such as dibutyltin dilaurate, dibutyltin diacetate and dioctyltin di-2-ethoxyhexoate, the latter three compounds being most preferred. If desired, mixtures of two or more catalysts can be employed.

In order to avoid premature gelation of the coating composition the siloxane component is best not combined with the siloxane curing catalyst until the composition is required for use. As the amino compound can also exert some catalytic curing action on the composition it may, in some cases, also be desirable to store this component separately from the siloxane component.

The process of the present invention can be employed in the production of abrasion resistant abhesive and water repellent coatings on a wide variety of papers and paper products including glassine, kraft, vegetable parchment, tissue and cardboard. The treated papers of the invention are useful, for example, in the fabrication of interleaving papers, backing papers for adhesive tapes and as bags and linings for bags for holding sticky materials such as bitumen.

The following examples illustrate the invention.

EXAMPLE 1

A solution was prepared employing 94 g. of xylene, 0.18 g. of a methylhydrogenpolysiloxane having a viscosity of about 40 cs. at 25° C. and 5.82 g. of a dimethylpolysiloxane gum containing terminal silicon-bonded hydroxyl radicals. To this solution was added 0.45 g. of a 50 percent by weight solution in xylene of dibutyltin di-2-ethylhexoate and 0.15 g. of ethanol isopropanolamine and the resulting solution applied by Meyer rod to a sample of glassine paper. The siloxane coating was then cured by heating at a temperature of 120° C. for 30 seconds, and the siloxane pickup on the paper found to be approximately 1 gram per square meter.

The abrasion resistance of the siloxane coating was tested by rubbing with the finger 30 minutes and 24 hours after the coating was applied. After 30 minutes the coating exhibited slight rub-off characteristics which were found to have improved when tested after 24 hours.

When the procedure was repeated with the ethanol isopropanolamine omitted from the coating composition, the resulting cured siloxane coating was found to be easily removed by rubbing with the finger.

EXAMPLE 2

Glassine paper was coated in the manner described in Example 1 except that the ethanol isopropanolamine of the composition of that example was replaced by N(2-aminoethyl)ethanolamine $$[H_2NCH_2CH_2NHCH_2CH_2OH]$$

The cured siloxane coating was tested for abrasion properties, and it was found to be highly resistant to removal from the paper by rubbing with the finger.

EXAMPLE 3

The procedure of Example 1 was repeated employing the following amines in turn in place of the ethanol isopropanolamine.

(a) ethylene diamine $H_2NCH_2CH_2NH_2$
(b) $H_2N(CH_2CH_2NH)CH_2CH_2NH_2$
(c) $H_2N(CH_2CH_2NH)_2CH_2CH_2NH_2$, and
(d) $H_2N(CH_2CH_2NH)_3CH_2CH_2NH_2$ In all cases the cured siloxane coating was found to be more resistant to removal by abrasion that when the amino compound was absent from the composition.

EXAMPLE 4

A solution was prepared employing 94 g. of xylene, 0.18 g. of a methylhydrogenpolysiloxane having a viscosity of about 40 cs. at 25° C., and 5.82 g. of a dimethylpolysiloxane gum containing terminal silicon-bonded hydroxyl radicals. To this solution was added 0.453 g. of $$Si(OCH_2CH_2OCH_3)_4$$

0.143 g. of N(2-aminoethyl)ethanolamine and 0.27 g. of a 50 percent by weight solution of dibutyltin diacetate in xylene. The N(2-aminoethyl)ethanolamine was added in the form of a solution in 5 ml. of isopropanol.

The above solution was applied by Meyer rod to a sample of glassine paper, the treated paper thereafter being heated to 70° C. for 30 seconds to remove excess solvent and cure the siloxane.

The abrasion resistance of the siloxane coating was tested by rubbing with the finger 30 minutes and 24 hours after the coating was applied. During the test at 30 minutes the coating smeared slightly on rubbing but after 24 hours no rub-off of the coating occurred.

EXAMPLE 5

A solution was prepared by taking 94 g. of xylene and dissolving therein 0.36 g. of the methylhydrogenpolysiloxane employed in Example 1 and 5.64 g. of a hydroxyl terminated dimethylpolysiloxane gum. To this solution was then added 0.125 g. of methyltrimethoxysilane, 0.136 g. of dibutyltin diacetate and 0.17 g. of N(2-aminoethyl)ethanolamine, the latter being added as a solution in about 5 ml. of isopropanol.

This solution was then applied by Meyer rod to a sample of glassine paper, the treated paper thereafter being heated to 150° C. for 10 seconds to cure the siloxane. When tested for abrasion resistance as described in Example 4, the siloxane coating smeared slightly 30 minutes after curing but no rub-off occurred after 24 hours.

That which is claimed is:

1. A composition consisting essentially of a mixture of 100 parts by weight of siloxane polymers consisting of (a) 0.1 to 10 parts by weight of an alkylhydrogenpolysiloxane, (b) 90 to 99.9 parts by weight of a diorganopolysiloxane wherein at least 80 percent of the total silicon-bonded organic radicals are methyl radicals and up to 20 percent of the organic radicals are monovalent hydrocarbon radicals, (c) a siloxane curing catalyst, (d) 0.5 to 7.5 parts by weight of an organic amino compound which is (i) ethanol isopropanolamine or (ii) an alpiphatic amine containing at least two groups selected from primary and secondary amino groups and consisting of carbon, hydrogen and nitrogen or carbon, hydrogen, nitrogen and oxygen present as —OH groups or ether linkages, and (e) an organic solvent.

2. A composition as claimed in claim 1 containing (f) 0.5 to 20 parts by weight of a silane of the general formula $R'_nSi(OR')_{4-n}$ wherein $R'$ is a monovalent hydrocarbon or halohydrocarbon radical and $R''$ is an alkyl radical of less than 5 carbon atoms, and $n$ is 0, 1, 2 or 3.

3. A composition as claimed in claim 2 wherein the silane is employed in a proportion of from 0.5 to 10 parts by weight.

4. A composition as claimed in claim 2 wherein the organic amino compound is N(2-aminoethyl ethanolamine).

5. A composition as claimed in claim 1 wherein the diorganopolysiloxane is a dimethylpolysiloxane containing terminal silicon-bonded hydroxyl radicals.

6. A composition consisting essentially of a mixture of 100 parts by weight of siloxane polymers consing of (a) 0.1 to 10 parts by weight of an alkylhydrogenpolysiloxane, (b) 90 to 99.9 parts by weight of a diorganopolysiloxane wherein at least 80 percent of the total silicon-bonded organic radicals are methyl radicals and up to 20 percent of the organic radicals are monovalent hydrocarbon radicals, (c) a siloxane curing catalyst, (d) 0.5 to 7.5 parts by weight of an organic amino compound selected from the group consisting essentially of ethanol isopropanolamine, ethylene diamine, diethylene diamine, tetramethylene diamine, diethylene triamine, piperazine, hexamethylene tetra-amine, cadaverine, 3-aminoethyl-1,6-diaminohexane, 2-pyrazoline, N,N'-dimethylhexamethylene diamine, N(2-aminoethyl)-butanolamine, (e) an organic solvent, and (f) 0.5 to 20 parts by weight of a silane of the general formula $R'_nSi(OR'')_{4-n}$ wherein $R'$ is a monovalent hydrocarbon or halohydrocarbon radical, $R''$ is an alkyl radical of less than 5 carbon atoms and $n$ is 0, 1, 2 or 3.

References Cited

UNITED STATES PATENTS

| | | | |
|---|---|---|---|
| 3,061,567 | 10/1962 | Keil | 260—825 |
| 3,247,153 | 4/1966 | De Vries | 260—825 |
| 3,419,508 | 12/1968 | Grenoble | 117—155 |
| 3,436,251 | 4/1969 | Rees | 260—825 |

SAMUEL H. BLECH, Primary Examiner

U.S. Cl. X.R.

117—155; 260—18, 33.6, 33.8